(12) United States Patent
Bianchi

(10) Patent No.: US 7,461,569 B2
(45) Date of Patent: Dec. 9, 2008

(54) SOLENOID DEVICE FOR ENGAGING POWER TAKEOFFS

(75) Inventor: Amedeo Bianchi, Provaglio D'Iseo (IT)

(73) Assignee: OMFB S.p.A. Hydraulic Components, Provaglio D'Iseo (Brescia) (IT)

( * ) Notice: Subject to any disclaimer, the term of this patent is extended or adjusted under 35 U.S.C. 154(b) by 356 days.

(21) Appl. No.: 11/423,823

(22) Filed: Jun. 13, 2006

(65) Prior Publication Data

US 2007/0135260 A1 Jun. 14, 2007

Related U.S. Application Data

(63) Continuation-in-part of application No. PCT/IT2005/000727, filed on Dec. 9, 2005.

(30) Foreign Application Priority Data

Feb. 3, 2006 (IT) .......................... BS2006A0021

(51) Int. Cl.
*F16H 59/00* (2006.01)
*B60K 17/04* (2006.01)

(52) U.S. Cl. .................................... 74/335; 74/473.12

(58) Field of Classification Search .................. 74/335, 74/473.1, 473.12, 490.11; 92/85 R, 85 A, 92/130 R, 132, 133; 251/65; 192/84.96
See application file for complete search history.

(56) References Cited

U.S. PATENT DOCUMENTS

| | | | | |
|---|---|---|---|---|
| 3,464,277 A | * | 9/1969 | Longshore | .................. 74/15.4 |
| 4,273,001 A | * | 6/1981 | Miyahara et al. | ............... 74/359 |
| 4,534,455 A | | 8/1985 | Fujikawa et al. | |
| 5,287,939 A | | 2/1994 | Fernandez et al. | |
| 6,202,812 B1 | * | 3/2001 | Semke | ...................... 192/48.91 |
| 6,792,821 B1 | * | 9/2004 | Yamamoto | .................... 74/335 |
| 6,874,750 B2 | * | 4/2005 | Muraji | ................... 251/129.04 |
| 2002/0096009 A1 | * | 7/2002 | Yamamoto et al. | ........ 74/473.12 |
| 2003/0080306 A1 | * | 5/2003 | Yoeda et al. | ............ 251/129.16 |
| 2003/0084860 A1 | * | 5/2003 | Haghgooie et al. | ....... 123/90.11 |
| 2005/0279607 A1 | | 12/2005 | Fusegi | |

FOREIGN PATENT DOCUMENTS

| | | |
|---|---|---|
| DE | 3828707 | 11/1989 |
| EP | 1176328 | 1/2002 |
| GB | 2084280 | 4/1982 |

* cited by examiner

*Primary Examiner*—Roger Pang
(74) *Attorney, Agent, or Firm*—Shoemaker and Mattare

(57) ABSTRACT

A device for engaging power takeoffs, primarily used to drive a load from the engine of a vehicle, has an electromagnet with a single winding of small size which is driven by a microprocessor system in PWM mode allowing to differentiate the current intensity of the engaging phase and of the phase of maintaining said engaging. The control system monitors, without the aid of external sensors, parameters such as electromagnet current, power supply and electromagnet voltage, electromagnet winding resistance, electromagnet winding inductance. From these parameters, the system is able to determine the engaging or unengaging position of the power takeoff, and it is able automatically to uncouple if the monitored parameters do not fall within the expected ranges, simultaneously notifying the user of the protective intervention.

25 Claims, 9 Drawing Sheets

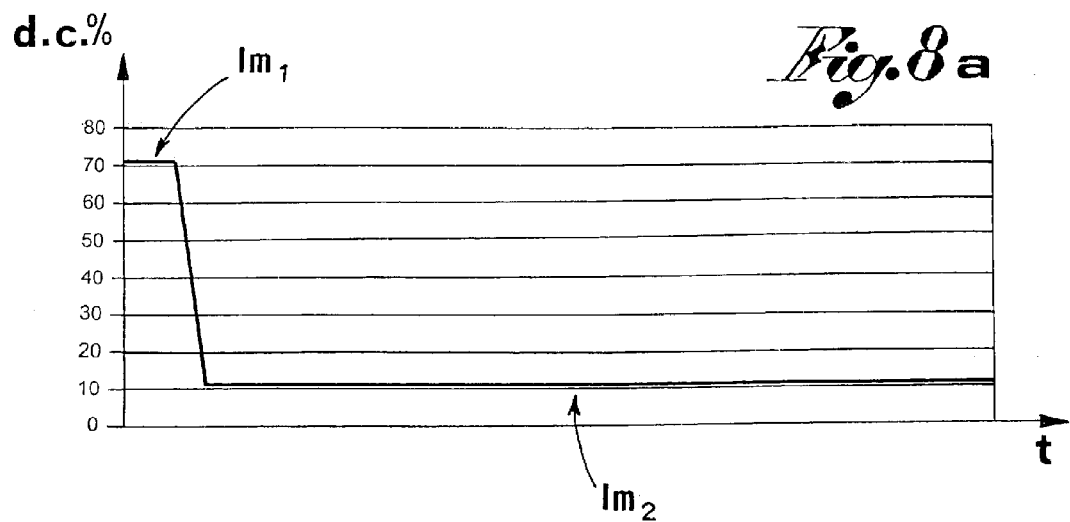
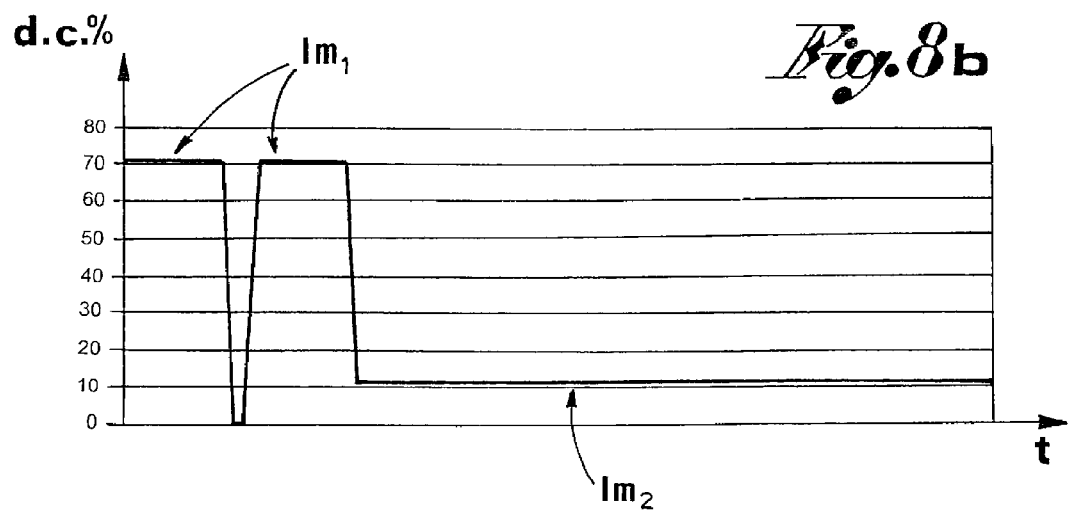
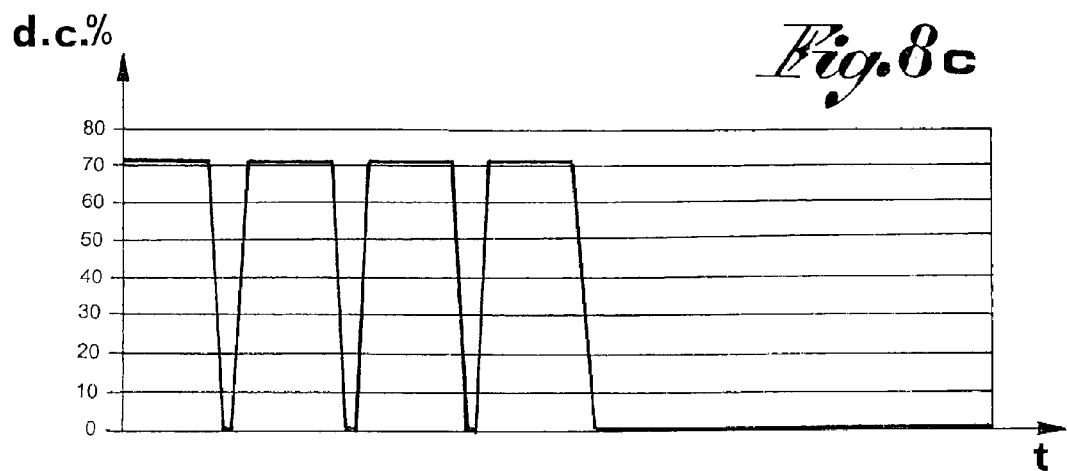

SOLENOID DEVICE FOR ENGAGING POWER TAKEOFFS

This application is a continuation-in-part of International Application No. PCT/IT2005/000727, filed on Dec. 9, 2005.

BACKGROUND OF THE INVENTION

The present invention relates to power takeoffs for industrial vehicles and in particular it refers to a device for engaging such power takeoffs, able to be actuated electrically by means of a solenoid.

As is well known, the power takeoff is a mechanical device with gears, connectable to the transmission of industrial vehicles and suitable for transmitting power from the gear to an external use, in particular to a rotary hydraulic pump which transforms mechanical power into hydraulic power to be supplied to a hydraulic system for multiple applications.

FIG. 1 shows an example of a power takeoff according to the state of the art.

The power takeoff is mainly constituted by:

a main body or box 1 (usually made of cast iron or aluminium) which constitutes the outer container of all the other mechanical elements and serves as fixed connection to the gear;

a main gear 2 which is engaged with the gear inside the gearbox and which transfers motion from the transmission gear to other gears inside the power takeoff;

one or more auxiliary gears 3 of the power takeoff;

an output shaft 4 which transmits motion from the internal gears of the power takeoff to the external device (usually a pump);

an engaging device which comprises an engaging assembly 5 that allows to transfer motion and hence power only when it is moved in an active position, called "engaged takeoff position", and actuating means 7 to move said engaging assembly to said active position; and an engagement indicator 6 which sends a signal to a receiver (usually, an electronic unit or an indicator light or a sound signalling device) only when the power takeoff is in the engaged position.

Depending on the type of the actuating means of the engaging assembly, currently used engaging devices can be subdivided into the following categories:

Mechanical engaging device: the power takeoff shifts from the inactive state to the active state through the displacement of a lever positioned in the cab of the vehicle and connected to the power takeoff by means of a cable inserted in a sheath and connected directly to the engaging assembly of the power takeoff itself. The motion of the lever is transmitted rigidly to the engaging assembly internal to the power takeoff, allowing it to shift from the inactive position to the active position.

Pneumatic engaging device (see FIG. 1): the engaging assembly inside the power takeoff is actuated by a single effect pneumatic piston contained in the power takeoff. The return of the power takeoff to the inactive position takes place by spring action. The device is actuated by compressed air available on the vehicle (air tank of the auxiliary services of the vehicle itself or dedicated compressor). The device is operated from the vehicle cab by means of manual pneumatic distributor or by the use of a switch controlling an electrical valve.

Vacuum engaging device: the system exploits the same concept as the pneumatic version using the pressure difference between environment and the power brake or power steering circuit of the vehicles. The system can be single or double effect. The system is operated from the vehicle cab by the use of a switch controlling one or more electrical valves (depending on whether the system is double or single effect).

Hydraulic engaging device: the system is wholly comparable to the pneumatic system with the sole difference that the fluid which transmits the force to the engaging system is oil and not air.

Hydraulic or pneumatic clutch engaging device: the pressurised fluid (oil or air) is introduced into a piston inside the power takeoff which acts against a system of clutch disks which transmit motion between the gears inside the takeoff and its output shaft. The system is operated from the vehicle cab by a control switch.

Electrical engaging device: the engaging assembly is moved by an electric motor, controlled by an electronic unit, through a worm screw-sliding block or other converter of rotary motion into linear motion. The system is operated from the vehicle cab by a control switch. An example of such a device is described in U.S. Pat. No. 4,651,852.

Electro-hydraulic engaging device: the engaging assembly is moved by a pressurised fluid created by a mini electrical pump incorporate in the power takeoff. The system is operated from the vehicle cab by a control switch.

Single effect solenoid engaging device: the engaging assembly is moved by a solenoid connected externally to the power takeoff and which transfers motion directly and rigidly or indirectly to the system inside the power takeoff. The return of the power takeoff to the inactive position takes place by spring action. The solenoid is constituted by a large single coil driven with a high current and hence with considerable use of energy and consequent overheating of the solenoid. Alternatively, the solenoid is constituted by two or more windings which are supplied power in different phases during engaging and maintaining with electrical, electromechanical or electronic systems. The latter device is described, for example, in U.S. Pat. No. 5,287,939.

Double effect solenoid engaging device: the engaging assembly is moved by a solenoid connected externally to the power takeoff and which transfers motion directly and rigidly or indirectly to the system inside the power takeoff. The return of the power takeoff to the inactive position takes place by solenoid action. The solenoids are constituted by a large single coil driven with a high current and hence with considerable use of energy and consequent overheating of the solenoids. Alternatively, the solenoids are constituted by two or more windings which are supplied power in different phases during engaging and maintaining with electrical, electro-mechanical or electronic systems. Devices of this kind are described for example in U.S. Pat. Nos. 3,577,789 and 4,669,562.

A problem with all the above mentioned engaging devices is evident in the engaging phase, which is better described below and which can be called "tooth against tooth jamming". In all the above mentioned devices, in fact, such jamming leads to the unsuccessful completion of the engaging phase and then to the necessary repetition of this phase by the operator. This leads, above other things, to a partial damaging of the gear teeth for every unsuccessful attempt and then, over a long period, to a failure of the power takeoff.

Another problem of the prior art devices is that, in order to furnish information on the real engaging state of the takeoff (which is basic for the takeoff interface towards the electronic units for the control of the vehicle automatic gear), it is necessary to use and install on the takeoff an end-stroke sensor, called "engagement signaler". For mounting such signaler on the power takeoff it is necessary to provide for a hole that communicates with the outside. Therefore, possible oil leakage points are introduced, with the consequence of a possible breakdown of the gears on which the takeoff is installed.

Possible malfunctions of said engagement signaler can also lead to wrong information to the gears electronic control unit, and therefore to damaging actions on said gears.

A further problem with the prior art devices is the impossibility of furnishing information about the temperature of the gear on which the power takeoff is mounted. Light vehicle gears are not provided with a system for controlling the temperature and, in case they work with lack of internal lubricant, they quickly get damaged.

SUMMARY OF THE INVENTION

An object of the present invention is to provide an engaging device for power takeoffs actuated by a solenoid which enables one to overcome the aforesaid limitations and drawbacks with respect to the engaging devices of this type.

This and other objects specified in the remainder of the description are achieved with an engaging device as described below.

BRIEF DESCRIPTION OF THE DRAWINGS

Further details and advantages of the engaging device for power takeoffs according to the present invention shall be more evident from the following description of a preferred embodiment thereof, given with reference to the accompanying drawings, in which:

FIGS. 8a, 8b and 8c show charts pertaining to the profile of the current driving the electromagnet, in the situations of engaging of the power takeoff at the first attempt, engaging of the power takeoff at the second attempt and failed engaging of the power takeoff after four attempts, respectively.

DETAILED DESCRIPTION

Figure 1:
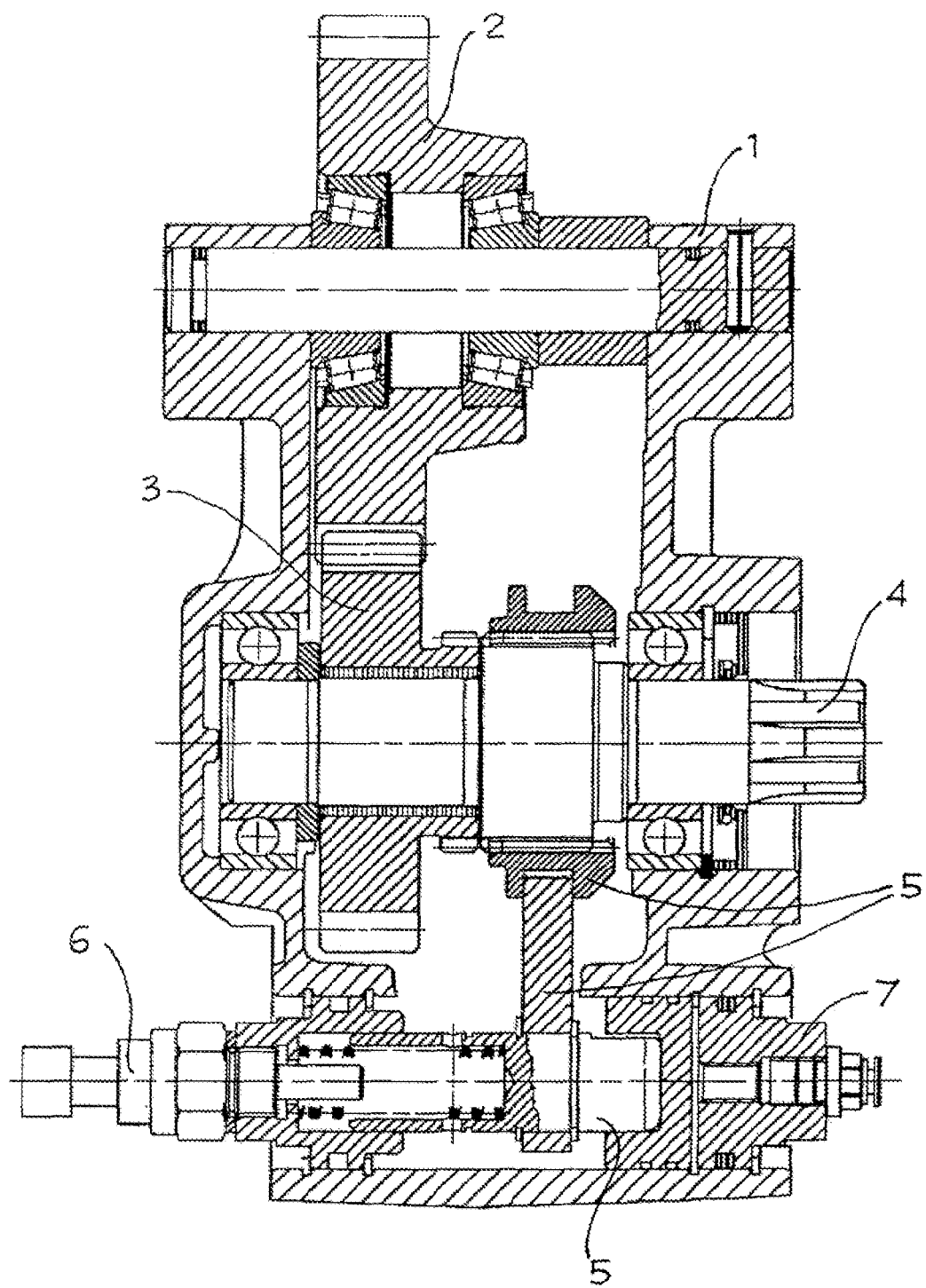
FIG. 1 shows an example of a power takeoff with related engaging device according to the prior art.
Figure 2:
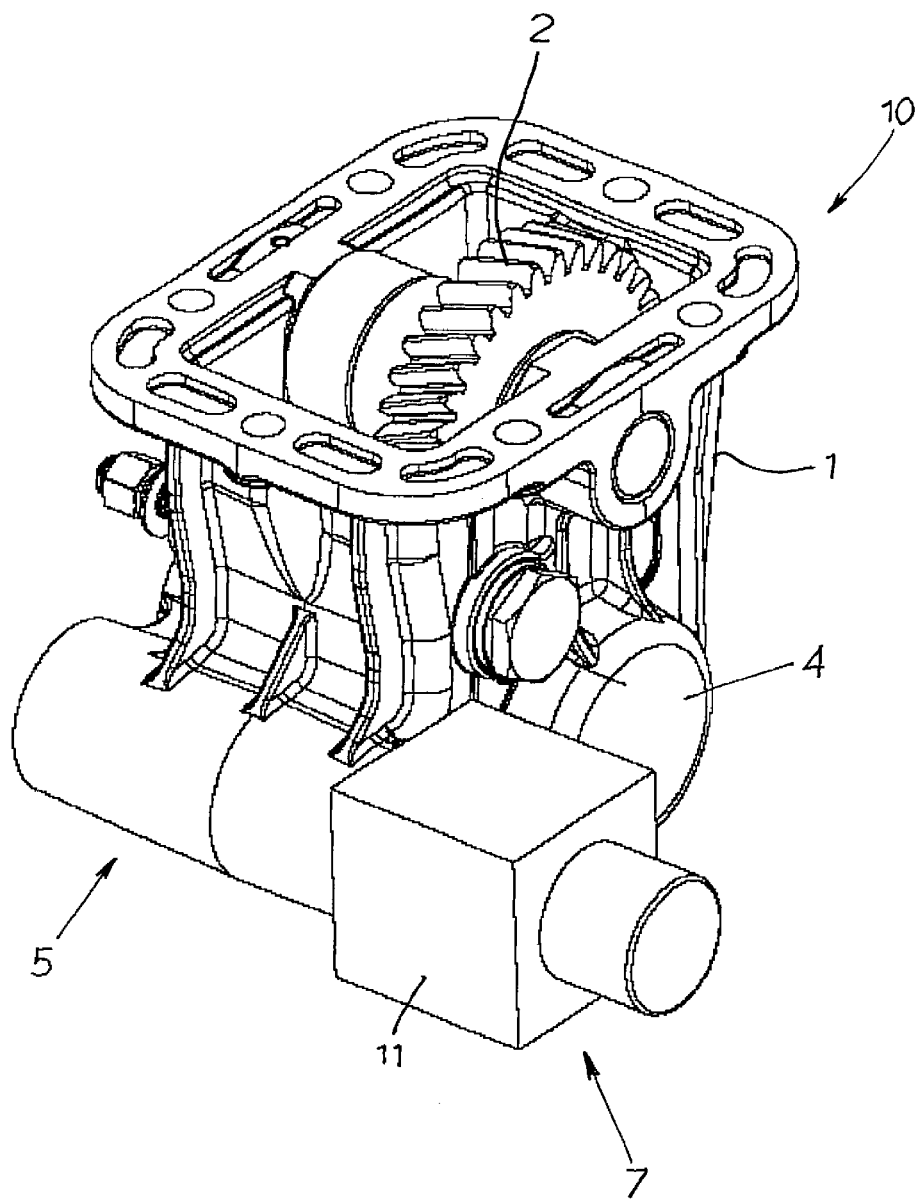
FIG. 2 shows a perspective view of a power takeoff with related engaging device according to invention.
Figure 3:
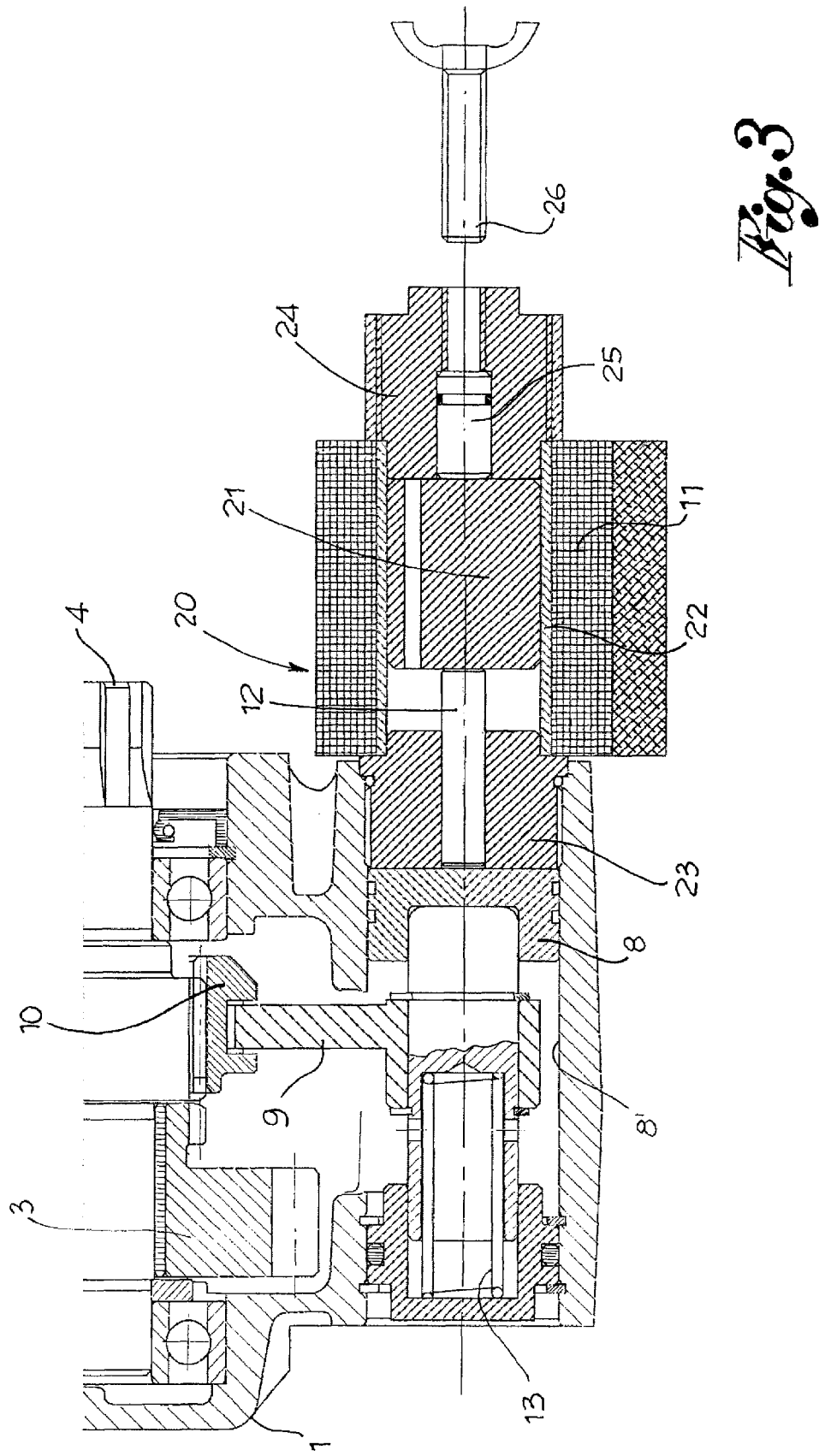
FIG. 3 shows a section view of the engaging device in inactive position with disengaged power takeoff.
Figure 4:
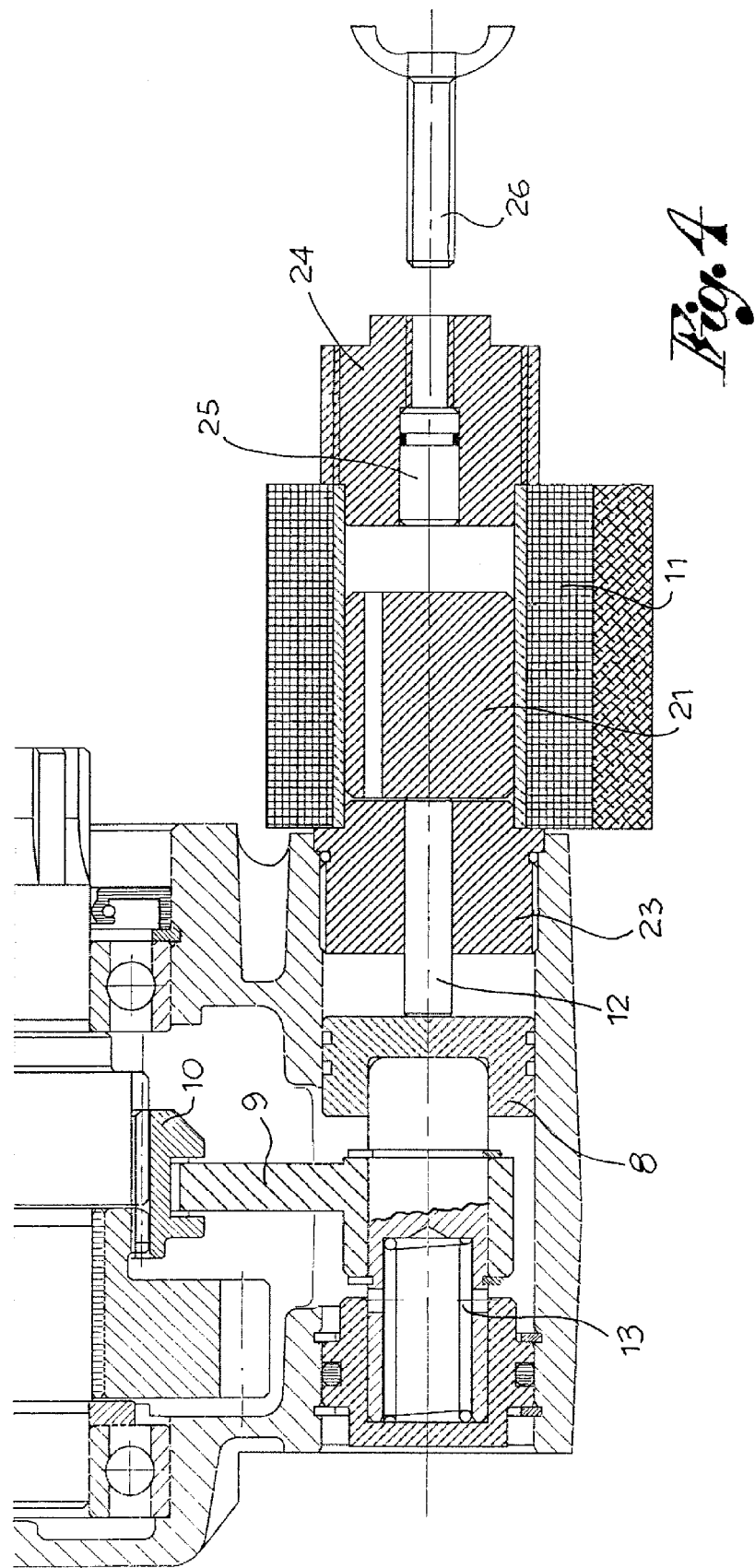
FIG. 4 shows the engaging device in active position with the power takeoff engaged.
Figure 5:
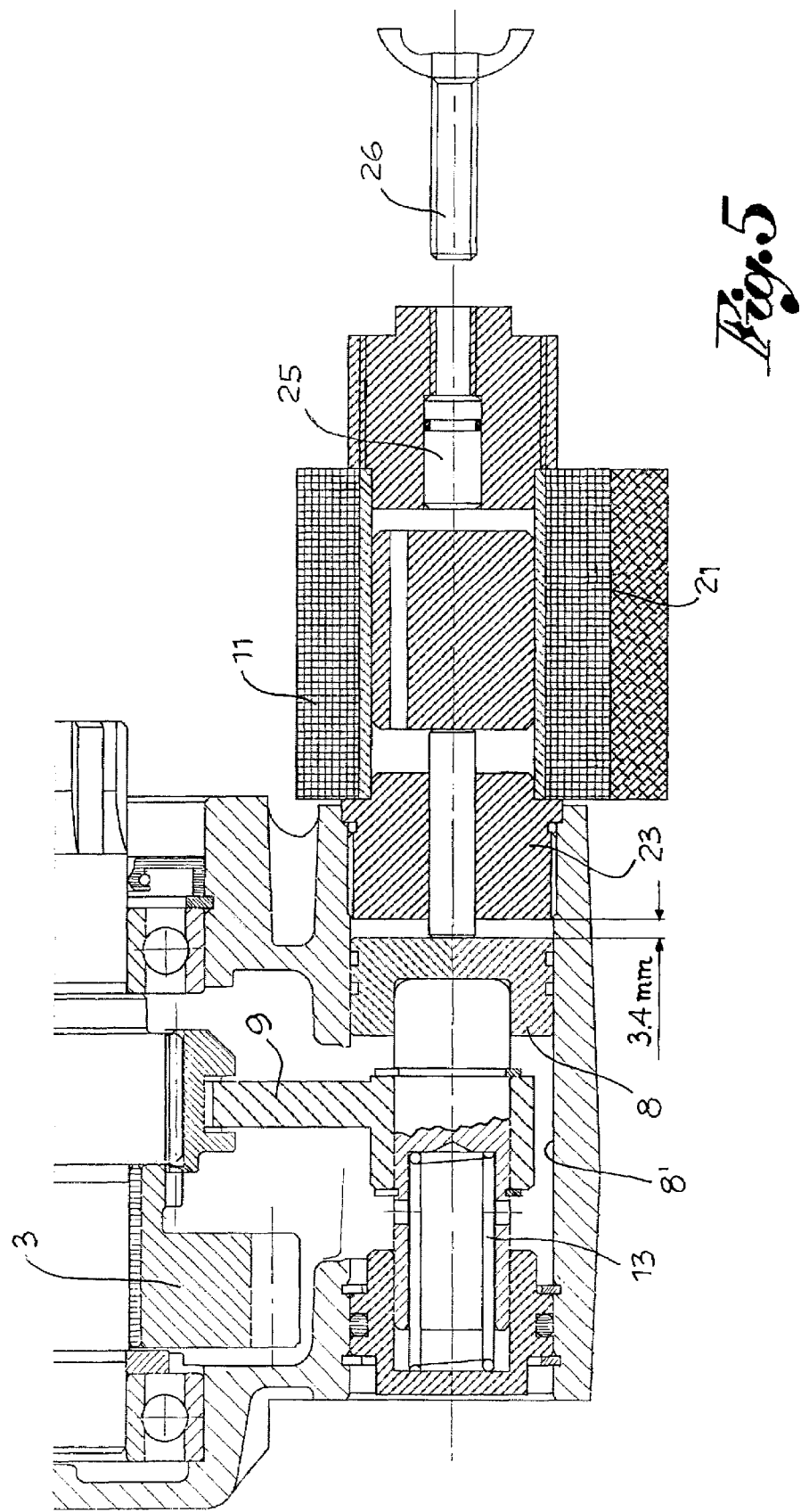
FIG. 5 shows the device in a jamming position.

With reference to FIGS. 2-6, the number 10 globally designates a power takeoff for industrial vehicles, comprising:

a main body or box 1 (usually made of cast iron or aluminium) which constitutes the outer container of all the other mechanical elements and serves as fixed connection to the transmission gear;

a main gear 2 which is engaged with the gear inside the transmission gearbox and which transfers motion from the transmission gear to other gears inside the power takeoff; one or more driven or auxiliary gears 3 of the power takeoff, which are engaged with the main gear 2;

an output shaft 4 adapted to transmit motion from the internal gears 2,3 of the power takeoff to an external device (usually a pump);

an engaging assembly 5 which allows the transfer of motion and hence of power only when it is moved to an active position, called engaged power takeoff position; and actuating means 7 to move said engaging assembly 5 from an inactive position to said active position.

The engaging assembly in turn comprises a engaging piston 8 movable between a rearward inactive position and a forward active position, a transmission element 9 integral with said engaging piston 8, and a meshing device 10 movable by said transmission element 9 between an inactive position and an active position that allows to couple the output shaft 4 with the auxiliary or driven gears 3.

The engaging piston 8 is guided and slidable in a respective seat 8' obtained in the body or box 1.

The actuating means 7 comprise an electromagnet 20 having a single winding 11 able to move, when excited, a movable anchor 21 whereto is fastened an actuating stem 12 acting on the engaging piston 8. The winding 11 is wound around a sleeve 22, within which the movable anchor 21 is guided and slidable.

In accordance with an embodiment, the electromagnet 20 is positioned coaxially and in continuation to the seat 8' where the engaging piston 8 slides. More particularly, the electromagnet 20 is fastened to the body 1 through a front bushing 23 which projects from the sleeve 22 to be screwed into the inlet of the seat 8'.

Said front bushing 23 further serves as guiding and sliding element for the actuating stem 12.

Figure 6:
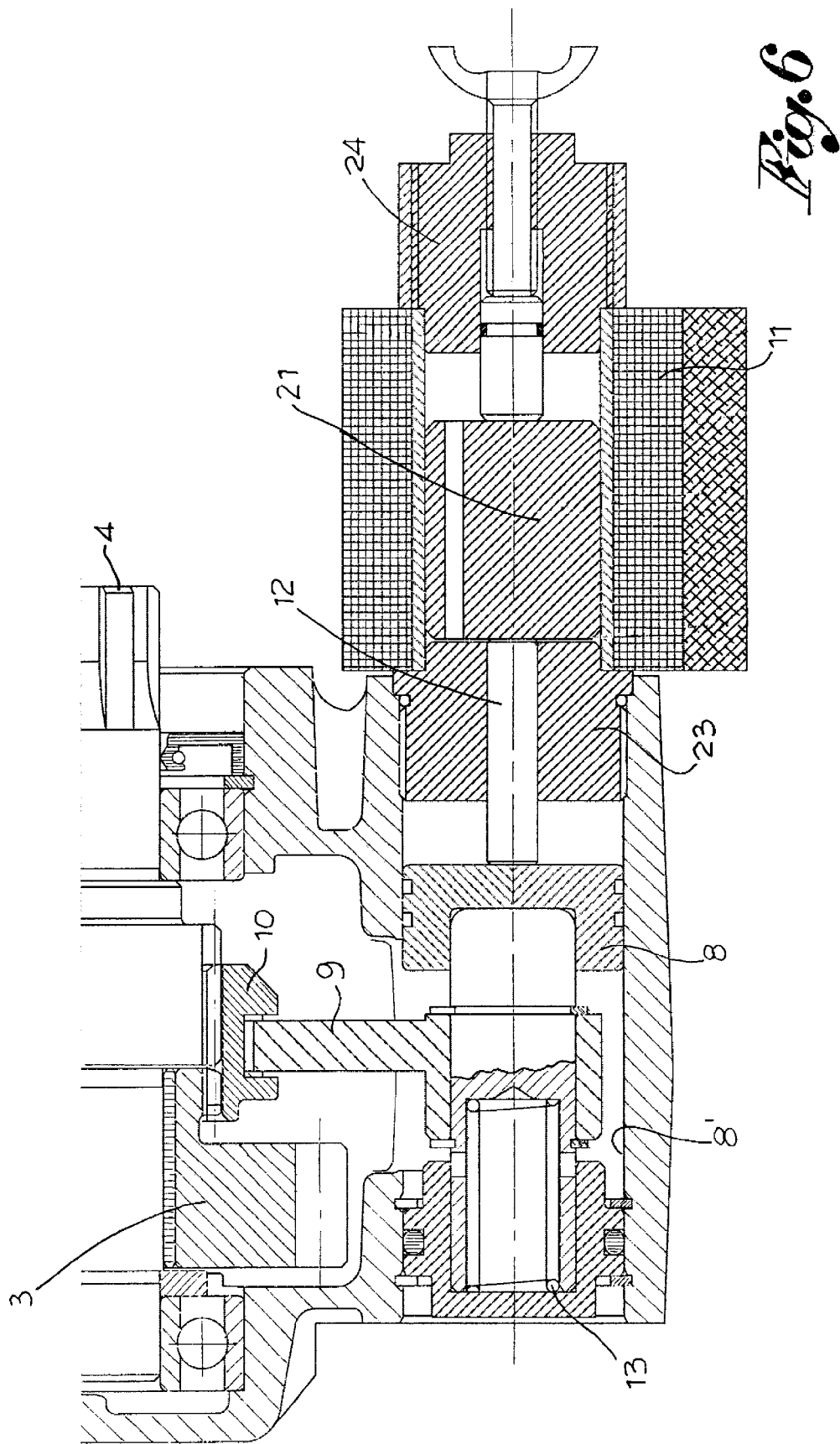
FIG. 6 shows the device operated manually in case of emergency.

In accordance with a preferred embodiment, the actuating means 7 further comprise a manual emergency device able to allow the engaging of the power takeoff even in case of malfunctions of the electromagnetic engaging system, thereby avoiding undesired machine idle times. In the illustrated embodiment, to the electromagnet is associated a rear bushing 24 which extends from the sleeve 22 in opposite direction relative to the front bushing 23 and in which is housed and able to slide a cursor 25 adapted to act on the movable anchor 21 for the engaging of the power takeoff. The cursor 25 is translatable by a manual emergency operating screw 26 which screws in the rear bushing 24 (FIG. 6).

The engaging piston 8 is urged by an elastic element 13 adapted to bring the piston back to the rearwards inactive position as a result of the de-excitation of the electromagnet 20 (or of the unscrewing of the emergency screw 26 from the rear bushing 24).

In accordance with the invention, the actuating means 7 further comprise an electronic device for controlling the current circulating in the winding, said electronic control device being programmed to supply a engaging current Im1 having such an average value as to allow the displacement of the engaging assembly 5 from the inactive position to the active position of engaged power takeoff and, once the engaging has taken place, to reduce the current supplied to a maintenance current Im2 whose average value is lower than that of the engaging current but sufficient to assure the maintenance of the engaging assembly in the active position.

In other words, the electronic control system is able to differentiate the power supply current of the electromagnet between the engaging phase and the phase of maintaining the engaging.

It has been observed that the current necessary for the engaging phase must have a high average value to overcome the inertia of the mechanical parts to be moved, the friction, and in particular any jamming between the meshing device 10 and the driven gears 3, while the current necessary to guarantee the maintenance of the engaging, i.e. the maintenance of the engaging assembly in forward active position is far smaller because it must be such as to overcome substantially only the force of the elastic element 13.

Tests conducted have shown, for example, that the force the electromagnet has to exert when maintaining the engaging is about half the force exerted by the electromagnet during the engaging phase.

In accordance with a preferred embodiment, the electronic device for controlling the current is integrated in the electromagnet.

Advantageously, the control device is embodied by a microprocessor.

In accordance with a particularly preferred embodiment, current control is effected by the electronic device by means of Pulse Width Modulation (PWM).

PWM modulation can be applied to the power supply voltage of the electromagnet or directly to the current.

Advantageously, the current that flows through the winding of the electromagnet is fed back to the microprocessor to define the value of the PWM driving duty cycle, and possibly for other purposes as well, through a shunt resistance or by means of methods based on the Hall effect or other methods whereby it is possible to measure different average current values with sufficient precision.

Advantageously, the electromagnet power supply voltage is fed back to the input of the microprocessor as information to be monitored in operation.

In particular, the electronic control device is programmed to deactivate and/or not allow the activation of the engaging if the power supply voltage is not higher than a value predetermined according to parameters of the forces at play, engaging times and maximum engaging and maintenance currents.

Advantageously, if the voltage drops below or exceeds respectively the minimum and maximum values of power supply voltage, the electronic control device activates a warning/alarm output to the user (be it a person or a machine).

In accordance with a particularly advantageous embodiment, the electronic control device is programmed to detect, without the aid of additional sensors or limit switches, the actual position of the meshing device of the power takeoff calculating the resistance and/or inductance values of the electromagnet by monitoring and mathematically processing the voltage and current values measured on the electromagnet by the control device.

In accordance with another aspect of the invention, the electronic control device is adapted to monitor the temperature of the electromagnet and of the device itself, measuring the variations in resistance and/or inductance of the electromagnet itself, processing them mathematically and comparing them with the expected values according to calibration values defined a priori.

The device temperature measurement allows to indirectly detect and then to steadily monitor also the temperature of the vehicle gear on which the takeoff is mounted. In presence of an abnormal overheating, an alarm signaling is immediately sent to the operator, saving the gear from breakage due to oil lack or leakage, for example due to mechanical breakings.

Advantageously, the electronic control device removes the power supply to the electromagnet winding bringing the driving duty cycle to 0 if the value of temperature reached exceeds a critical threshold defined a prior.

In this case, the electronic control device activates a warning/alarm output to the user (be it a person or a machine) indicating that the temperature threshold has been exceeded and consequently the power takeoff has been unengaged.

In accordance with another aspect of the invention, the electronic control device is programmed to manage automatically, according to appropriate procedures (e.g., repetition of some attempts with different times and/or currents), the tooth against tooth jamming condition of the displaceable meshing device 10 with the driven gears 3, determining the actual position of the meshing device, by simply elaborating the electromagnet resistance and/or inductance values, as described above. It is therefore not necessary to use and install any additional sensor.

Said power takeoff real position detection system offers a greater security in interfacing with the electronic central units for controlling the automatic gears, since such system is completely exempt from possible mechanical problem with respect to electromechanical or electro pneumatic engagement signalers.

Moreover, the information is evaluated by the microprocessor, for example integrated in the device itself, and its coherence with the contour situation is checked. This reduces the risk of wrong signals, that is the signal of takeoff engaged, when it is not, or, on the contrary, the unsuccessful signal of takeoff engaged, when the latter instead is engaged.

In the engaging devices according to the prior art, the common electro-mechanic or electro-pneumatic engagement signalers, if subjected to mechanical problems, often lead to a wrong signaling of the power takeoff engaging state, with serious consequences for the power takeoffs themselves, for the connected apparatus, which draw their motion from the power takeoff, and for the gears from which the motion is drawn.

The engaging device according to the invention drastically reduces this problem since the information processed from the parameters steadily monitored by the microprocessor is checked with the contour conditions, before being transmitted to the output. For example, if the power takeoff engagement has not been requested by the operator, the microprocessor holds in any case the output signal low, since it is impossible that the power takeoff autonomously engages. The actual signaling systems, on the contrary, in presence of a short circuit due, for example, to mechanical breakage of the signaler or water infiltration, can lead to a wrong signaling of the power takeoff engaging state.

When, instead, the operator has started a power takeoff engaging cycle, if the monitored parameters values do not correspond to those expected, the microprocessor always disengages the power takeoff, thus saving the whole system downstream and upstream with respect to the power takeoff itself.

If the jamming condition cannot be overcome even after a certain number of attempts, a warning/alarm output is activated.

In accordance with an embodiment, the control device receives as an input the command for engaging/disengaging the power takeoff from a low current circuit.

In accordance with a further aspect of the invention, the control device receives as an input a signal to enable the power takeoff engaging/disengaging operations conditioned to the pressure of the clutch pedal, to the condition of the hand brake, or to the state of any other condition or sum of conditions which must be provided for the execution of such operations.

Advantageously, moreover, the electromagnet is adapted to be supplied power with voltages between 10 V and 30 V, in such a way as to be usable in the same version both with vehicles with 12V power supply and in vehicles with 24V power supply.

Figure 7:
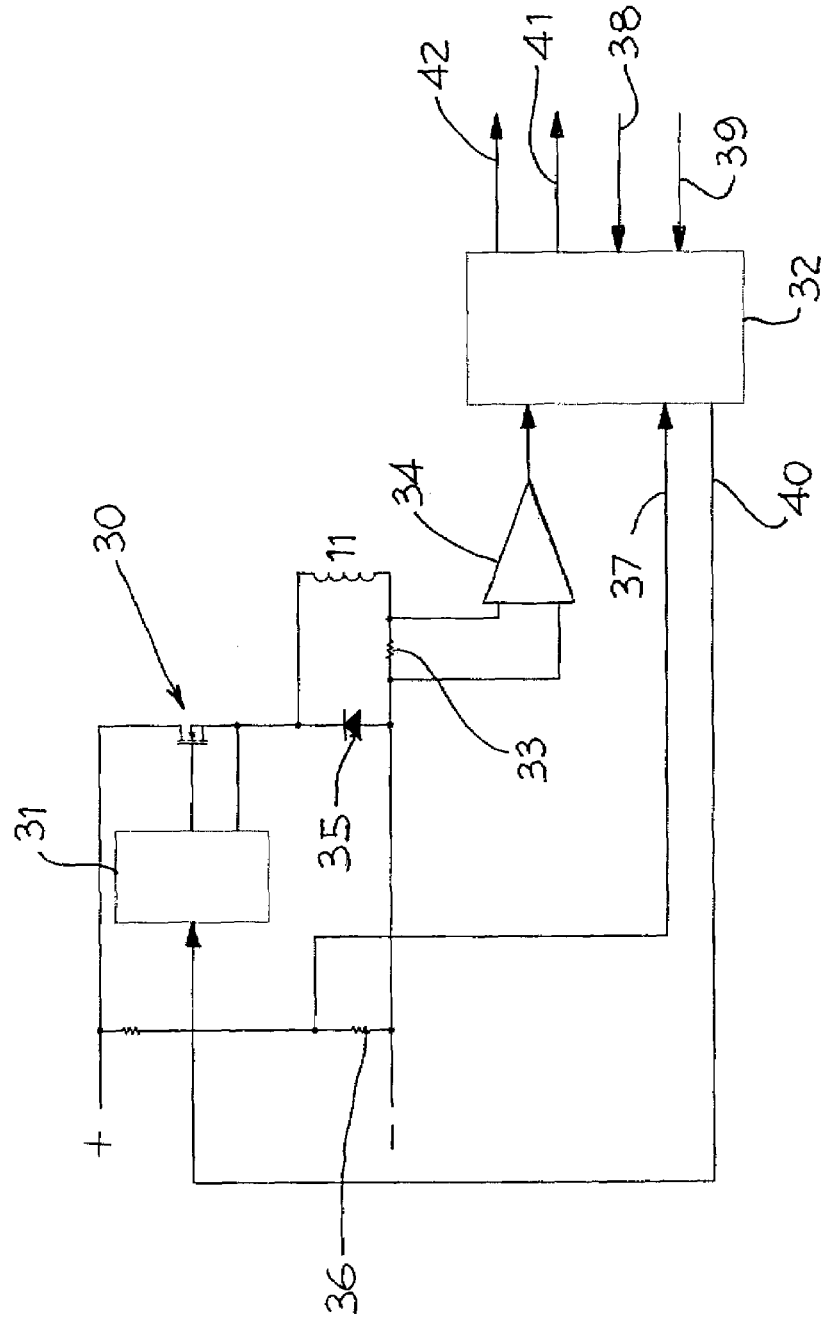
FIG. 7 shows a diagram of the circuit for controlling the current circulating in the electromagnet.

In accordance with a preferred embodiment schematically shown in FIG. 7, the device for electronically controlling the current circulating in the winding 11 comprises a power transistor 30 for driving the current that powers the electromagnet. For example, said transistor is a Power MOSFET, e.g. of the type commercially known by the code IRF1404, able to drive a direct drain current between 202 A and 143 A (respectively at 25° C. and 100° C.).

The power transistor 30 is commanded by a driver 31, e.g. of the type commercially known by the code IR2111.

The driving current control is managed by a microprocessor 32, e.g. of the type commercially known by the code MC9SO8GT32 or other microprocessor suitable to manage peripherals with PWM operation, i.e. with Pulse Width Modulation at least two integrated analogue/digital converters.

To the winding 11 is connected a shunt resistance 33 for measuring the information about the current flowing through the electromagnet and to feed said information back to the microprocessor 32. The shunt resistance 33 must have a smaller value by at least one order of magnitude than the value of resistance of the winding 11. Alternatively to the shunt resistance, circuits based on Hall effect sensors or other devices may be used.

The voltage value measured across the shunt resistance 33 is amplified by a differential amplifier 34 before being fed back to the input of the microprocessor 32.

In parallel to the winding 11 of the electromagnet is provided a recirculation diode 35 suitable to withstand high currents.

The electromagnet power supply voltage is monitored through a voltage divider 36. The measured voltage value is fed back on an input 37 of the microprocessor.

The microprocessor 32 has an additional input 38 for low current driving of the command for engaging/disengaging the power takeoff and an input 39 for a possible external signal enabling the engaging, e.g. conditioned to the clutch pressure, to the state of the handbrake, to a combination thereof and/or other signals which may be considered useful to allow engaging under determined safety and/or operating conditions.

The microprocessor 32 has an output 40 which supplies the control signal PWM to the driver 31 of the power transistor 30.

Moreover, the microprocessor 32 has an output 41 for an alarm signal, e.g. if a temperature threshold is exceeded, if power supply voltage is insufficient or excessive, if engaging is impossible following the procedure for managing the condition of sticking.

Lastly, an output 42 is provided for a signal on the engaged or disengaged state of the power takeoff.

Figure 9:
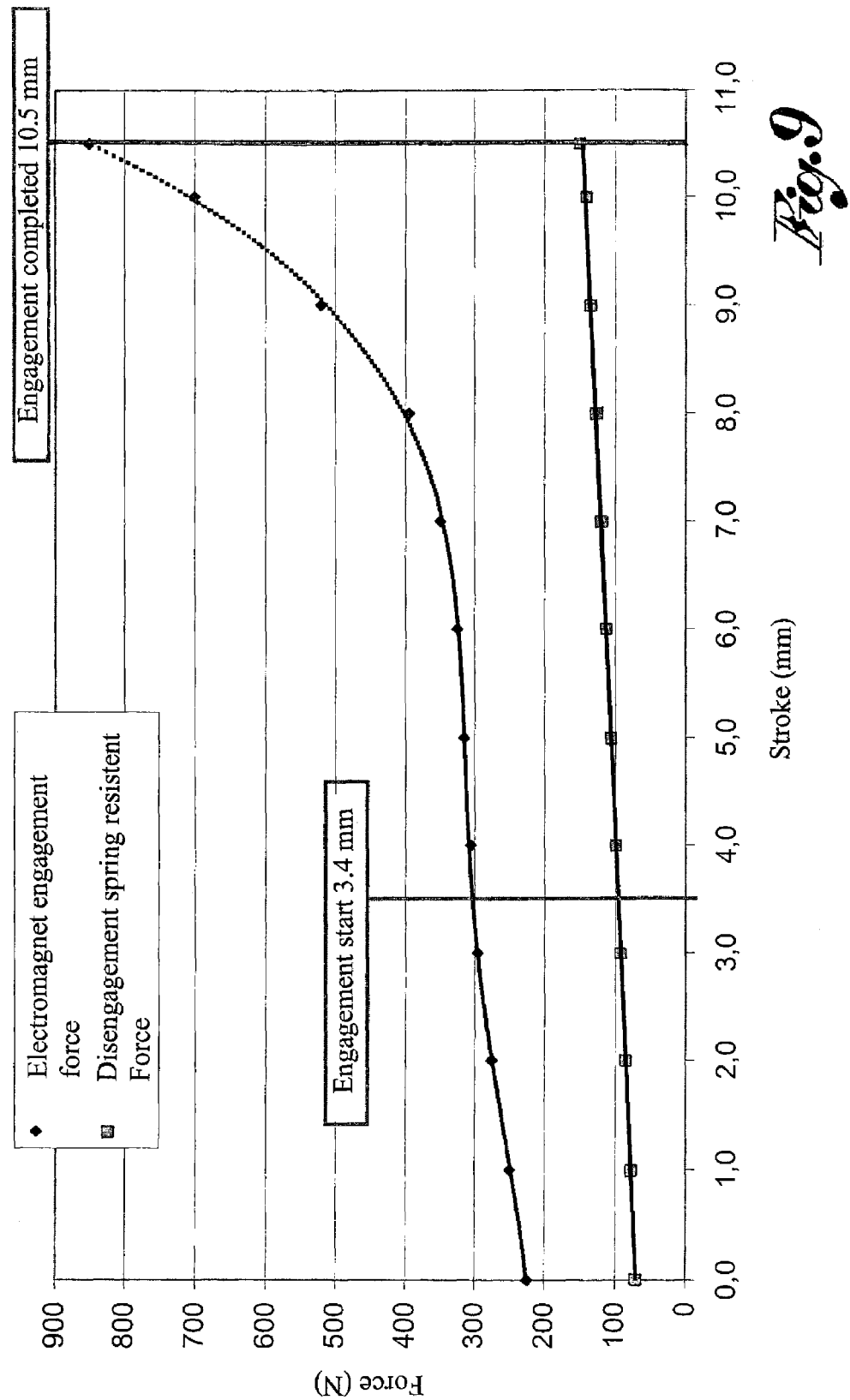
FIG. 9 is a chart of the engaging force as a function of the stroke of the actuator stem, for an average engaging current Im of 46 A (Ampere).

FIG. 9 shows the curve of the engaging force of the electromagnet versus the travel of the movable anchor in an embodiment that provides for an average current Im1 during the engaging phase, equal to 46 A. The chart also shows the curve of the resisting force produced by the elastic element 13.

From the chart, it is readily apparent that when the actual engaging of the system, measured at about 3.4 mm of travel, starts, the available force already exceeds 300 N, while at the completion of the engaging a value above 800 N is reached. This profile of the engaging curve, obtained for an average current of 46 A, enables the system to manage in optimal fashion the engaging start phase even when encountering any tooth-to-tooth sticking conditions of the movable meshing device 10 and of the gear 3. This force curve allows, once the engaging has started and the engaging start phase has been overcome, to reach the complete superposition between movable meshing device and gear, at the completion of the 10.5 mm travel, in a sufficiently short time, such as not to force the user to keep the clutch pedal pressed (always necessary during the engaging phase) for more than two seconds.

Once the travel, and hence the engaging phase, is complete, the electromagnet driving current is commanded to drop drastically down to an average value of 8 A, i.e. about 17% with respect to the value of the engaging current, which allows one to obtain a maintenance force with completed travel (10.5 mm) that still exceeds about 400 N, sufficient to overcome the reaction force of the unengaging spring 13 and hence to guarantee the maintenance of the engaging during the working cycle of the power takeoff.

The electromagnet thus obtained allows a 100% ED use of the system when maintaining the engaging at the value of average maintenance current of 8 A: in any case the control system always monitors temperature drift and it is able to cut off the power supply of the system when any critical threshold, defined a priori, are exceeded.

In accordance with a preferred embodiment, the value of the average current Im1 in the engaging phase, of 46 A, and the value of the average current Im2 in the maintenance phase, of 8 A, are obtained with two PWM modulated signals with peck value 10V, base frequency 300 Hz, and duty cycle (d.c.) values determined according to the value of the resistance of the electromagnet winding, e.g. of about 0.15 Ohm at 20° C. Therefore, the indicative value of the control duty cycle necessary to obtain the desired average values of engaging and maintenance current is 70% and 12%, respectively.

Since the electromagnet is subject to a variation in the value of resistance corresponding to every variation in the temperature of the winding, it is necessary to consider also a limit value that sees resistance rise to about 0.21 Ohm at 140° C., value for which the duty cycle will have to be brought to about 99% for the engaging phase and 17.3% for the maintenance phase.

In normal operation, the electronic control device continuously monitors the actual instantaneous value of resistance of the electromagnet (and hence its temperature as well) and adapts the command duty cycle to the values necessary to assure the desired average engaging and maintenance currents.

The information about the value of resistance is determined by the control device which knows the value of the power supply voltage (continuously monitored by the microprocessor) and the actual instantaneous value of the current flowing through the coil, fed back to the microprocessor input through the shunt resistance and the differential amplifier.

In this way the control device, applying Ohm's law R=V/I, is able to know at all times the current value of resistance of the winding. As a function of this value of resistance, the control device adapts the duty cycle value, especially during the maintenance phase which, because of the configuration of the system, is the one that takes the longest time and therefore the one during which the system can undergo significant temperature variations over time, to the value necessary to keep a sufficient maintenance current to assure that the electromagnet exerts the force required to maintain the engaging, e.g. 8 A.

The control device, having available the values of the power supply voltage and of the current flowing in the winding, is able to calculate the actual inductance value of the electromagnet, value that being linked to the position of the anchor inside the sleeve, also reflects a variation in the two conditions of engaged and unengaged power takeoff. Use of this information enables the control device to manage an output signalling the engaging of the power takeoff.

Among the different methods for determining the value of the inductance of the winding, particularly advantageous is the one entailing an evaluation of the times taken by the value of the current in the electromagnet to rise and/or drop as a result of a single PWM pulse. The value of the inductance can be obtained simply from the ratio between the applied voltage and the derivative of the current.

The same information can advantageously also be used to manage the monitoring of the engaging phase: in particular, a preferred control method is the one entailing the evaluation of the inductance value after one second from the engaging command: if said value, when compared with a predetermined value, is such as to correspond to the position of "Engaged power takeoff", the control device lowers the current to the maintenance value Im2 reducing the duty cycle to the prescribed value (FIG. 8a). If instead the information that emerges from the comparison equates to "Unengaged power takeoff", the system interrupts the engaging procedure, lowering the duty cycle to 0 and, after a short interval, e.g. 100 ms, it tries a complete cycle again, bringing the duty cycle to the value prescribed for the engaging phase and verifying again, after one second, whether the inductance value reached is the expected one (FIG. 8b).

In an advantageous embodiment, the control device automatically manages up to four engaging attempts, whereupon it warns the operator with an alarm signal that the engaging procedure was not successful and hence the takeoff remains unengaged (FIG. 8c).

Summarising, the control system monitors, without the aid of external sensors, some parameters such as electromagnet current, power supply and electromagnet voltage, electromagnet winding resistance, electromagnet winding inductance. From these parameters, the system is able to detect the real position of the meshing device in the engaging and holding phase, taking advantage of such information for automatically managing the eventual jamming situation. In this way, the probability of a failed engagement, the time requested to the operator for obtaining the engagement, wear and damaging of the gear teeth are reduced, thus increasing the life of the power takeoff itself. The system is also able to automatically disengage the power takeoff if the monitored parameters do not fall within the expected ranges, simultaneously notifying the user of the protective intervention.

The engaging device according to the invention allows to eliminate the use of all previous power takeoff engaging methods and the specific problems linked to each of them: impossibility of monitoring the gear temperature, time expenditure for the repetition of engagement attempts by the operator, power takeoff damaging due to jamming situations during the engagement phase, the need of a supplementary sensor for detecting the real position of the meshing device, the alterations in the adjustment of mechanical cable engagings, breakage and low engaging force of electrical engagings, air leaks and ruptures of the pneumatic lines of pneumatic engagings, fouling and alterations to the vehicle braking system, typical of vacuum engaging, low engaging force and poor strength of electro-hydraulic engagings, excessive development of heat and/or large bulk typical of single or double solenoid engagings.

In particular, the engaging device proposed herein allows a drastic reduction in the problems related to electromagnet overheating due to the current that flows through it, and therefore allows to use a very small electromagnet.

With the device proposed herein, the kinematic chain between engaging device and meshing device is minimized, preventing risks of failure and minimizing manufacturing costs.

The microprocessor-based smart control automatically manages multiple engaging attempts if the first fails within a determined time interval and it is able to differentiate the engaging conditions in the subsequent attempts in intelligent and predetermined fashion, notifying the operator as to whether or not the power takeoff was engaged successfully.

The microprocessor-based smart control is able to interact with the user of the engaging system and it is also able to perform continuous self-diagnosis with respect to the main operating parameters, automatically unengaging if one or more of said parameters exceed determined critical thresholds.

The microprocessor-based smart control is able to process the information about some parameters of the electromagnet, in order automatically to detect, with no need for additional sensors and/or limit switches, the engaged or unengaged state of the power takeoff.

What is claimed is:

1. Engaging device for power takeoffs, comprising
an engaging assembly movable between an inactive position of unengaged power takeoff and an active position of engaged power takeoff,
actuating means which are activable to move said engaging assembly from the inactive position to the active position, and
disengaging means adapted to bring the engaging assembly back to the inactive position as a result of the deactivation of said actuating means, wherein said actuating means comprise an electromagnet and an electronic device for controlling the current circulating in said electromagnet, said electronic control device being programmed for monitoring the voltage and current across the electromagnet terminals and for detecting the engaging assembly position according to the electromagnet resistance and/or inductance values derivable from said voltage and current values.

2. Engaging device according to claim 1, wherein the electronic control device is programmed to use the information relating the effective engaging assembly position to manage automatically possible jamming conditions of said engaging assembly.

3. Engaging device according to claim 1, wherein the electronic control device is adapted to monitor the temperature of the electromagnet, of the device itself, and indirectly of the gear onto which the device is mounted, measuring the variations in resistance and/or inductance of the electromagnet itself, processing them mathematically and comparing them with the expected values according to calibration values defined a priori.

4. Engaging device according to claim 3, wherein the electronic control device is programmed to remove the power supply to the electromagnet if the value of temperature reached exceeds a critical threshold defined a priori.

5. Engaging device according to claim 1, wherein said electronic device is programmed to supply a engaging current having such an average value as to allow the displacement of the engaging assembly from the inactive position to the active position and, once the engagement has taken place, to reduce the current supplied to a maintenance current whose average value is lower than that of the engaging current but sufficient to assure the maintenance of the engaging assembly in the active position.

6. Engaging device according to claim 5, wherein the value of the maintenance current is lower than 50% of the value of the engaging current.

7. Engaging device as claimed in claim 6, wherein the value of the maintenance current is about 15-20% of the value of the engaging current.

8. Engaging device according to claim 1, wherein said engaging assembly comprises an engaging piston movable between a rearward inactive position and a forward active position, a transmission element integral with said engaging piston, and a meshing device movable by said transmission element between an inactive position and an active position that allows the engaging of the power takeoff.

9. Engaging device as claimed in claim 8, wherein said unengaging means comprise an elastic element acting on the engaging piston.

10. Engaging device according to claim 8, wherein said electromagnet comprises only one winding.

11. Engaging device as claimed in claim 1, wherein the electronic device for controlling the current is integrated in the electromagnet.

12. Engaging device as claimed in claim 1, wherein the control device is obtained with a microprocessor.

13. Engaging device as claimed in claim 5, wherein current control is effected by the electronic device by means of Pulse Width Modulation (PWM).

14. Engaging device as claimed in claim 5, wherein the electronic control device operates on the electromagnet power supply voltage or directly on the current.

15. Engaging device as claimed in claim 1, wherein the current that flows through the electromagnet winding is fed back to the electronic control device by means of a shunt resistance or by means of methods based on the Hall effect or other methods whereby it is possible to measure with sufficient precision currents with different average values.

16. Engaging device as claimed in claim 1, wherein the electromagnet power supply voltage is fed back to the input of the microprocessor as information to be monitored in operation.

17. Engaging device as claimed in claim 1, wherein the electronic control device is programmed to deactivate and/or not allow the activation of the engaging if the power supply voltage is not higher than a value predetermined based on parameters of the forces at play, engaging times and maximum engaging and maintenance currents.

18. Engaging device as claimed in claim 17, wherein, if the voltage drops below or exceeds respectively the minimum and maximum values of power supply voltage, the electronic control device activates a warning/alarm output to the user (be it a person or a machine).

19. Engaging device as claimed in claim 18, wherein the electronic control device is programmed to activate a warning/alarm output to the user (be it a person or a machine) indicating that the temperature threshold has been exceeded and consequently the power takeoff has been unengaged.

20. Engaging device as claimed in claim 1, wherein the control device receives as an input the command for engaging/unengaging the power takeoff from a low current circuit.

21. Engaging device as claimed in claim 1, wherein the control device receives as an input a signal to enable the power takeoff engaging/unengaging operations conditioned to the pressure of the clutch pedal, to the condition of the hand brake, or to the state of any other condition or sum of conditions which must be provided for the execution of such operations.

22. Engaging device as claimed in claim 1, wherein the electromagnet is adapted to be supplied power with voltages between 10 V and 30 V, in such a way as to be usable in the same version both with vehicles with 12V power supply and in vehicles with 24V power supply.

23. Power takeoff comprising a main gear which is engaged with the gear inside the transmission of a motor vehicle, one or more driven or auxiliary gears, which are engaged with said main gear, at least one output shaft adapted to transmits motion from the driven gears to the external device, and a engaging device as claimed in any of the previous claims.

24. Method for operating a engaging assembly of a power takeoff by means of electromagnet, comprising the steps of:
powering the electromagnet with a engaging current having such an average value as to allow the displacement of the engaging assembly to a engaging position and, once the engaging is complete,
reducing the electromagnet power supply current to a maintenance current having a lower average value than the engaging current but sufficient to assure the maintenance of the engaging assembly in the engaged position,
wherein the occurred engagement is detected by means of a check of the electromagnet resistance and/or inductance values.

25. Method as claimed in claim 24, wherein said values of resistance or inductance are obtained by monitoring and mathematically processing the voltage and current values measured on the electromagnet itself.

* * * * *